United States Patent [19]

Holz

[11] 3,786,918
[45] Jan. 22, 1974

[54] PRESSURE FILTER FOR FIBROUS SUSPENSIONS

[75] Inventor: Emil Holz, Eningen/Wurttenberg, Germany

[73] Assignee: Hermann Finckh Metalltuch-und Maschinenfabrik, Reutlingen/Wurtt, Germany

[22] Filed: Aug. 27, 1971

[21] Appl. No.: 175,625

[30] Foreign Application Priority Data
Aug. 16, 1971 Germany.................. 7131282

[52] U.S. Cl.................. 209/273, 209/306, 209/379, 210/342
[51] Int. Cl.................. B07b 1/04, B01d 29/26
[58] Field of Search... 210/304, 333, 338, 342, 345, 210/409, 380, 512; 209/270, 173, 306, 379

[56] References Cited
UNITED STATES PATENTS

| 3,223,239 | 12/1965 | Dick | 210/338 X |
| 3,174,622 | 3/1965 | Lamort | 210/304 X |
| 3,053,391 | 9/1962 | Nelson | 210/304 |
| 3,029,951 | 4/1962 | Cannon | 210/304 |
| 3,092,578 | 6/1963 | Cannon et al. | 210/304 |

Primary Examiner—Samih N. Zaharna
Assistant Examiner—T. A. Granger
Attorney, Agent, or Firm—Spencer & Kaye

[57] ABSTRACT

A pressure filter for fibrous suspensions including a multiple component housing within which at least one stationary upright filter basket is disposed. The housing is divided into an upper housing section and a lower housing section with a stock inlet in the upper housing section and a stock outlet in the lower housing section, and with the stationary basket being supported by the lower housing section.

6 Claims, 4 Drawing Figures

PRESSURE FILTER FOR FIBROUS SUSPENSIONS

BACKGROUND OF THE INVENTION

The present invention relates to a pressure filter for fibrous suspensions, especially as used in the paper manufacturing industry.

Known pressure filters of this type have the disadvantage that e.g., if throughflow quantity per unit of time is too small, they must be replaced by an apparatus of other size or other construction, which as a rule necessitates alterations in the foundation and the pipelines. The same drawbacks occur where a known pressure filter fails to attain an adequate purity of the filtered media for certain suspensions, so that in place of a simple filtering, a filtering in multiple stages becomes imperative.

SUMMARY OF THE INVENTION

The aim of the present invention was therefore to produce a pressure filter which, by retaining the inlet and outlet pipe connections for the suspensions to be processed, or of the filtrates passed through, can in a simple manner and by application of the smallest feasible number of components, be converted to make an optionally greater throughflow or a finer filtration possible.

The solution of this problem starts out from a pressure filter for fibrous suspensions as is disclosed, for example, in German Pat. No. 1,946,948, namely, a pressure filter with at least one stationary filter basket that stands upright in a multiple component housing, with a stock inlet in the upper part of the housing and a stock outlet in the lower part of the housing, whereby the last named section also accommodates the bearing arrangement and the drive of a rotor that revolves within the filter basket. According to the invention it is suggested to divide the housing between stock inlet and stock outlet into an upper housing section having the stock inlet and a lower housing section having the stock outlet and, in a pressure filter with only one fixed filter basket, to have the same borne by the lower housing section. Consequently, if the foundation for the lower housing section is retained, with the lower housing section proper, the rotor and its bearing arrangement plus drive remaining in place, then the upper housing section can be removed and replaced by an upper housing section arranged either for an in parallel or in series throughflow through two filter baskets. The invention proposes a pressure filter on the unit construction principle, where the lower housing section with the foundation, the drive components and a basic unit for the rotor are identical for a total of three different types of pressure filters.

In the subdivision of the housing in keeping with the instant invention construction may furthermore be such that in a pressure filter with a dirt gutter and a rejected stock outlet for the filter basket, disposed on the outer side of said basket, the housing lower section includes said dirt gutter and rejected stock outlet and ends shortly above the same. In this manner the two last named elements of a pressure filter can also remain unchanged for all three pressure filter types.

If, starting out from the pressure filter according to the instant invention with only one stationary filter basket, a pressure filter for a greater throughput capacity is to be set up, then it will be expedient to design the upper housing section so that it is provided with a second outer stationary filter basket concentric to the first filter basket, with an annular partition between the lower region of the second filter basket and the upper edge of the first filter basket, furthermore, that in the upper housing section, surrounding the second filter basket and in communication with the stock inlet, there is an annular chamber in whose lower region and below the annular partition there are disposed apertures for feeding stock into the internal first filter basket, whereby the rotor is provided with agitating vanes overlapping the first filter basket as well as the annular partition and rotating along the inner side of the second filter basket. Beside the upper housing section all that is required are therefore additional agitating vanes for the rotor, whereby it is naturally also possible to exchange the entire rotor. In the latter case it may be any optional rotor of known make that either also has agitating vanes for the inner first filter basket or a rotating filter basket.

If a basic pressure filter of the instant invention with only one filter basket is to be converted into a pressure filter with filter baskets arranged for series throughflow to intensity the purity of the filtrate, then again a modification of the upper housing section will suffice and this will expediently be of such configuration that concentrically to the filter basket there is disposed a second stationary filter basket and an annular partition that surrounds the latter and is in communication with the stock inlet, whereby the rotor has agitating vanes that overlap the first filter basket and rotate along the inside of the second filter basket; provided below the vanes is a cover closing the space inside the first inner filter basket, the cover being penetrated by a driving shaft of the rotor for the agitating vanes. For the rotor, that again applies which has been said in connection with the pressure filter having two parallely disposed filter baskets.

On all these pressure filter machines, the upper housing sections can be dimensioned so that they all have identically dimensioned inlet and outlet ports, as a result of which no changes in the pipelines to be connected to the pressure filters are necessary. In the same manner, the number of components required for converting one type of pressure filter into another can be reduced in that the rotor components and/or the inner and outer filter baskets are made dimensionally identical and interchangeable.

Further characteristics and details of the invention result from the appendixed claims and/or the following specification plus the attached drawings that are explained in the specification and in which the three types of a preferred embodiment of a pressure filter after the present invention are schematically illustrated, showing:

BRIEF DESCRIPTION OF THE DRAWINGS

FIG. 1b illustrates a a section along line B — B of FIG. 1a;

DESCRIPTION OF THE PREFERRED EMBODIMENTS

Figure 1A:
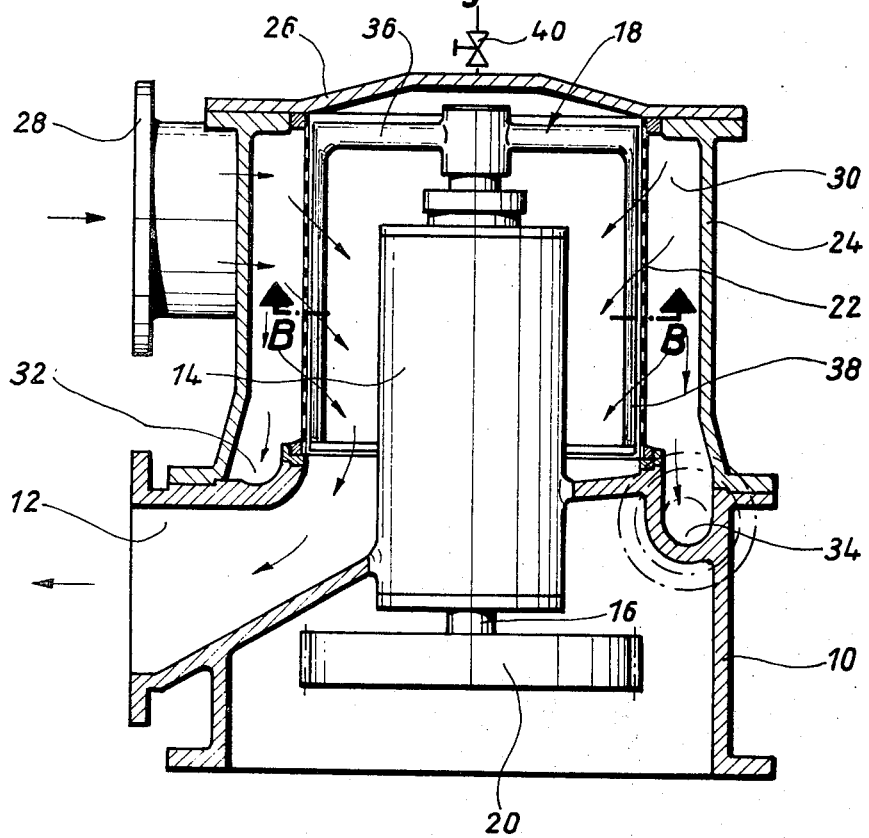
FIG. 1a illustrates a schematic vertical section of the basic unit of the pressure filter of the instant invention.

The basic apparatus shown in FIG. 1 has a lower housing section 10 that also forms the pedestal of the apparatus, with a stock outlet 12 for the filtered suspension and a bearing assembly 14 for the driven shaft 16 of a rotor generally designated 18. The shaft is driven by a belt pulley 20 secured thereto. On the lower housing section 10 there is also mounted a first stationary filter basket 22 and on this there rests, supported by lower housing section 10, an upper housing section 24 with a cover 26. The apparatus furthermore displays a stock inlet 28 to feed the suspension to be filtered into the pressure filter. The stock inlet empties into a first annular compartment 30 that surrounds the filter basket 22 and at the base of which lower housing section 10 forms a dirt gutter 32 that discharges into a rejected stock outlet 34, indicated only in dot-dash lines.

Figure 1B:
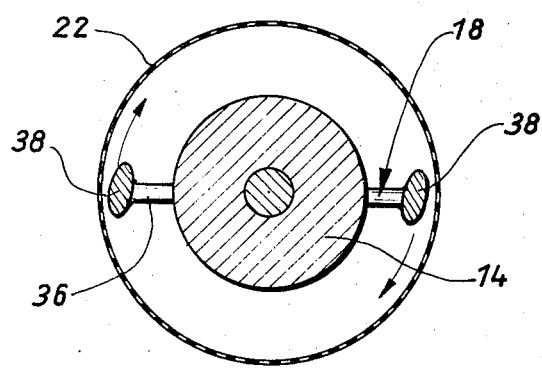

The rotor 18 is comprised of a spider 36 with agitating vanes 38 rotatably secured to driven shaft 16, as shown in FIG. 1b. The agitating vanes rotate closely about filter basket 22 and display a known profile, as shown in FIG. 1b, in which the direction of rotor rotation is also indicated.

Finally the removable cover 26, secured by screws (not shown), is also provided with an air vent valve 40.

Current flow through the pressure filter is indicated by arrows; the suspension entering at stock inlet 28 first flows through the stationary filter basket 22 whereby the contaminations that cannot pass through the filter basket settle downwards in the direction of dirt gutter 32 and can be discharged at rejected stock outlet 34. The suspension subjected to a single filtering exits from the pressure filter through the stock outlet 12.

Figure 2:
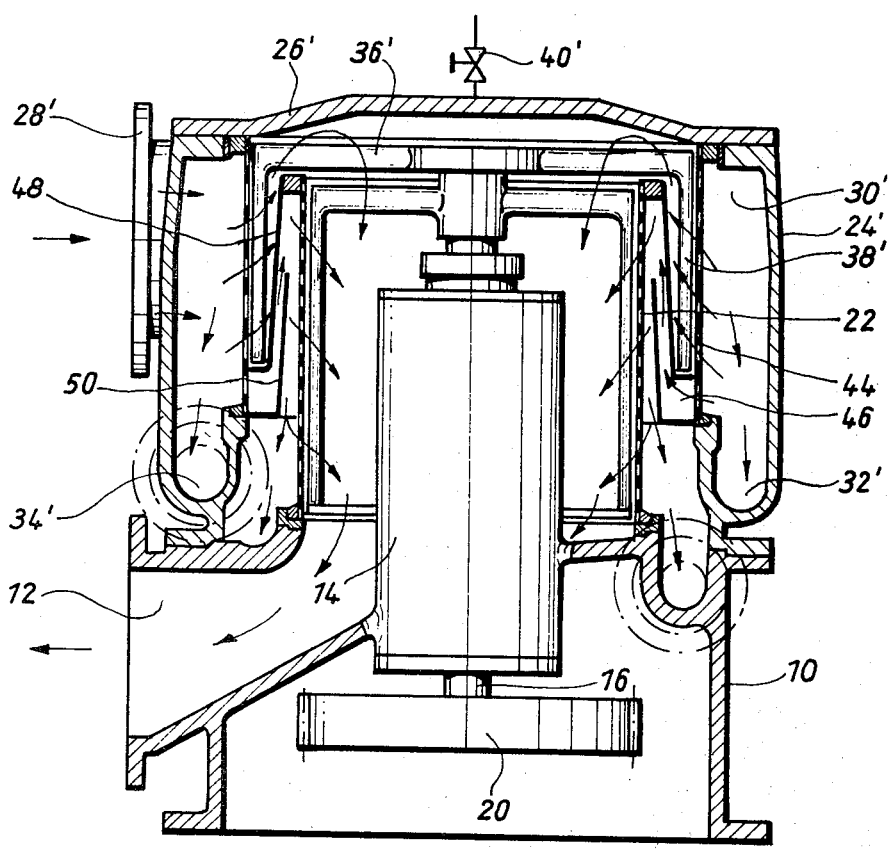
FIG. 2 illustrates a section corresponding to FIG. 1a through a pressure filter with filter baskets for parallel throughflow, produced from the basic apparatus after FIG. 1a by interchanging the upper housing section.

In FIG. 2 all the components that are also included in the apparatus illustrated in FIG. 1, have been given the same reference characters. The pressure filter shown in FIG. 2 has a modified upper housing section generally designated as 24' having a cover 26', which again rests on the lower housing section 10.

A stock inlet 28' empties into an outer first annular chamber 30' at the base of which the upper housing section forms a dirt gutter 32' with a rejected stock outlet 34', indicated by dot-dash lines. Furthermore, the upper housing section contains a second stationary outer filter basket 44 which in its lower region has comparatively large inflow apertures 46 and on top filtering perforations that are somewhat larger than the filtering perforations of the first filter basket 22. From the region between the inflow apertures 46 and the filter perforations of the second filter basket 44 to the top edge of the first filter basket 22 there extends a first annular partition 48, whereas from the lower edge of the second filter basket 44 upwards there extends a second annular partition 50 with a free top edge.

Finally, on the rotor 18 there is mounted an additional spider 36' with outer agitating vanes 38', whereby the latter rotate close to the inside of the second filter basket 44. An air vent valve 40' is disposed in cover 26'.

The flow of the suspended stock to be filtered is also indicated by arrows in FIG. 2; the suspension passes over the stock inlet 28' to the outer annular chamber 30'. Here the suspension separates, one part flowing through the outer filter basket 44 while another part flows through the inflow apertures 46 and between the annular partitions 48 and 50 to the inner filter basket 22. Contaminations separated out at the outer filter basket 44 precipitate in the dirt gutter 32' and can be removed over the rejected stock outlet 34', while contaminations separated out on the outside of the inner filter basket 22 are collected in dirt gutter 32 and eliminated over rejected stock outlet 34. That part of the suspension that has flowed through the filter basket 44 flows pass the spiders 36' and 36 into the space inside the inner filter basket 22 where it unites with the throughflow from the latter filter basket, whereupon the filtered fluid leaves the pressure filter through the stock outlet 12. The pressure filter according to FIG. 2 thus displays two filter baskets disposed for parallel throughflow.

Figure 3:
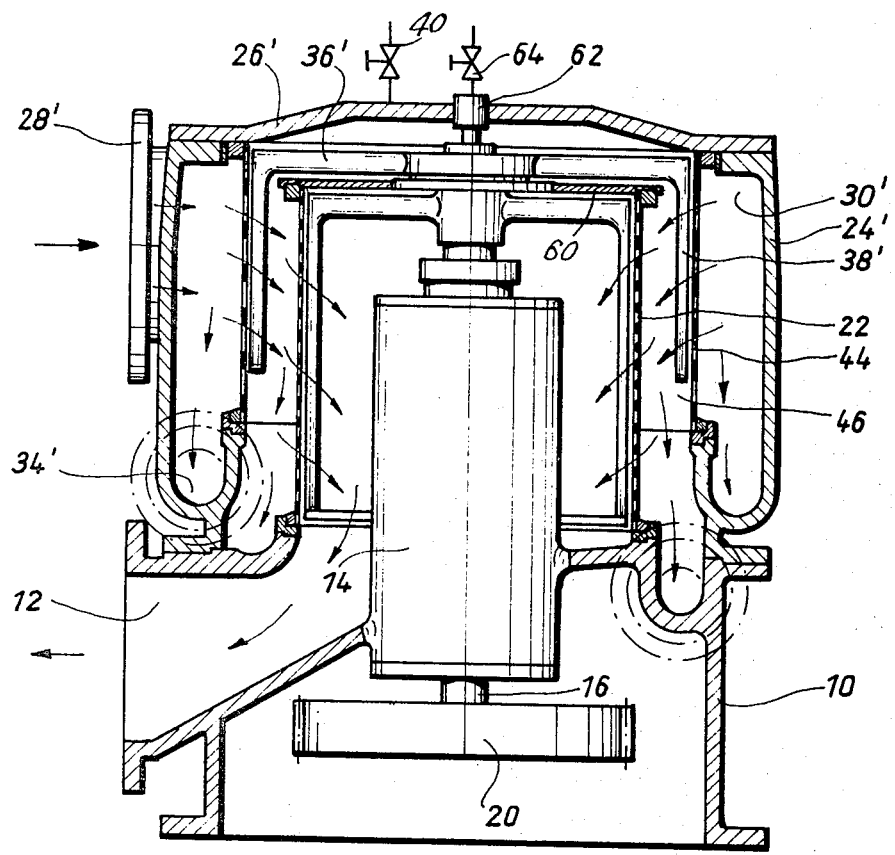
FIG. 3 illustrates a pressure filter corresponding to FIG. 1a with filter baskets arranged for series throughflow, likewise comprised of the basic apparatus after FIG. 1a by replacement of upper housing section.

The pressure filter according to FIG. 3 differs from that of FIG. 2 solely in that the annular partitions 48 and 50 are omitted and that the outer filter basket 44 has no inflow apertures 46. Moreover, there are two further components, namely, an end cover plate 60 penetrated by the driven shaft 16 that shuts off the space within the inner filter basket 22 in upward direction, and a connecting piece 62 which may be either an extra bearing for shaft 16 or which sits upon the top of said shaft. In a machine of this type the space within the inner filter basket 22 is ventilated through a bore (not shown) in shaft 16 and an additional bore (not shown) in connecting piece 62 plus an air vent valve 64 mounted on the latter.

Throughflow of the fibrous suspension in the pressure filter according to FIG. 3 is as follows : The suspension entering the outer annular chamber 30' through the stock inlet 28' flows sequentially through the two filter baskets 44 and 22 and exits from the pressure filter through the stock outlet 12. In this pressure filter on which the filter baskets are disposed for in-series throughflow, the outer filter basket 44 naturally has larger perforations than the inner filter basket 22. Coarse contaminations are again eliminated over the rejected stock outlet 34' while the finer contaminations separated out at the inner filter basket 22 can be eliminated over rejected stock outlet 34.

It remains to be stated that in FIG. 3 the same reference characters are applied as in FIG. 2 for those components that are also displayed in the pressure filter according to FIG. 2.

By this invention it has thus become possible, in a pressure filter with one filter basket and in a pressure filter with two filter baskets arranged for parallel throughflow as well as in a presure filter with two filter baskets arranged for in-series throughflow, to design the inlet and outlet flanges with identical dimensions and to apply identically dimensioned and interchangeable rotor components and filter baskets, so that a pressure filter in three different variations can be set up with a minimum of components and without requiring any alterations on the inlet and outlet connections.

I claim:

1. A pressure device having two filters connected in parallel for filtering a liquid containing suspensions of fibrous material, comprising in combination:

a. a housing including an upper housing section having a stock inlet and a lower housing section having a stock outlet;
b. an inner upright filter basket disposed in said housing and supported by said lower housing section, said inner filter basket having a filtering surface, an upstream side and a downstream side;
c. drive means secured to said housing;
d. an inner vaned rotor disposed at the downstream side of said inner filter basket and operatively connected to said drive means;
e. an outer filter basket arranged upright about said inner filter basket, said inner and outer filter baskets defining an annular space therebetween, said outer filter basket having a filtering surface;
f. bypass means arranged at said annular space and defining a relatively large, non-filtering inflow aperture means adjacent said filtering surface of said outer filter basket, a first part of said liquid entering said stock inlet flowing through said bypass means and a second part of said liquid entering said stock inlet flowing through said filtering surface of said outer filter basket, said bypass means directing said first part of said liquid to flow into said annular space with the circumvention of the filtering surface of said outer filter basket;
g. an outer vaned rotor situated in said annular space and operatively connected to said drive means; and
h. a partition in said annular space for directing said first part of said liquid onto the filtering surface of said inner filter basket and for directing said second part of said liquid to said downstream side of said inner filter basket with the circumvention of the filtering surface thereof.

2. A pressure filter as set forth in claim 1, wherein said outer filter basket includes means defining relatively large, non-filtering inflow apertures adjacent its filtering surface, said apertures constituting said bypass means.

3. A pressure filter as set forth in claim 1, wherein said partition extends from a lower zone of said outer filter basket to an upper zone of said inner filter basket, said partition sealingly terminates on said outer filter basket and on said inner filter basket.

4. A pressure filter as set forth in claim 3, wherein said bypass means is disposed in said lower zone below said partition.

5. A pressure filter as set forth in claim 3, further comprising an additional partition disposed in said annular space and having a free-standing upper edge and a lower edge sealingly terminating under said bypass means.

6. A pressure filter as set forth in claim 1, further comprising
i. a hollow drive shaft passing through said housing and said downstream side of said inner filter basket, said shaft forming part of said drive means; and
j. an air vent valve situated externally of said housing and communicating with said downstream side of said inner filter basket through said hollow shaft.

* * * * *